United States Patent
Kim

(10) Patent No.: US 6,490,266 B1
(45) Date of Patent: Dec. 3, 2002

(54) METHOD FOR TEST CALL SYNCHRONIZATION OF CODE DIVISION MULTIPLE ACCESS CELLULAR SYSTEM

(75) Inventor: Wan-ho Kim, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/282,814

(22) Filed: Mar. 31, 1999

(30) Foreign Application Priority Data

Mar. 31, 1998 (KR) ............................................. 98/11220

(51) Int. Cl.⁷ ......................... H04B 7/216; H04B 17/00
(52) U.S. Cl. ..................... 370/342; 375/149; 455/67.4
(58) Field of Search ................................ 370/329, 230, 370/335, 342, 328, 241, 250, 277, 247, 248, 249, 252, 251; 455/522, 69, 239, 423, 234.1, 67.1, 67.4; 342/378, 357.06; 375/224, 227, 222, 134, 137, 145, 149; 714/750, 776, 798

(56) References Cited

U.S. PATENT DOCUMENTS

| | | | | |
|---|---|---|---|---|
| 5,481,588 A | * | 1/1996 | Rickli et al. | ................... 379/24 |
| 6,052,584 A | * | 4/2000 | Harvey et al. | ............... 370/241 |
| 6,058,107 A | * | 5/2000 | Love et al. | ................... 370/252 |
| 6,181,738 B1 | * | 1/2001 | Chheda et al. | ............... 370/252 |
| 6,272,119 B1 | * | 8/2001 | Kage | ........................... 370/335 |

* cited by examiner

*Primary Examiner*—Charles N. Appiah
(74) *Attorney, Agent, or Firm*—Dilworth & Barrese, LLP

(57) ABSTRACT

A method for test call synchronization of a code division multiple access (CDMA) cellular system is disclosed. The method includes the steps of: establishing a test callbetween a mobile station and a base station; maintaining a transmit index in said base station and sending the transmit index on each forward frame sent to the mobile station, the transmit index being masked from forward frames which comprise initial traffic sent to the mobile station, the value of the transmit index being increased for every forward frame transmitted; measuring forward link quality by the mobile station for each forward frame received by the mobile station and sending a reverse frame from the mobile station to the base station including information on said measured forward link quality and also sending said information contained in the forward frame; receiving and checking said received reverse frame by the base station, if the result of checking is normal, setting the value of a receive index to be equal to that of said transmit index included in the reverse frame, otherwise increasing the value of said receive index; and substituting the transmit-index for the receive-index when the mobile station receives each frame from the base station.

5 Claims, 4 Drawing Sheets

METHOD FOR TEST CALL SYNCHRONIZATION OF CODE DIVISION MULTIPLE ACCESS CELLULAR SYSTEM

BACKGROUND

1. Field of the Invention

The present invention relates to a method for test call synchronization in a code division multiple access (CDMA) cellular system. More particularly, this invention relates to a method for test call synchronization between a mobile station and a base station without using Global Position System Time as absolute time.

2. Description of the Related Art

A cellular system requires extensive manpower and capital to carry out the network management function. A test call is provided as a solution to the problem by providing operators with means for measuring the composite quality of forward and reverse links in BSC (Base Station Controller). The test call does not measure a quality of one cell but rather measures the quality under environments including handoffs among a plurality of cells, as seen in FIG. 1 such as cells 100, 110, 120, and 130. The creation and comparing of packets are preferably performed in the TSB (Transceiver and Selector Bank 140) of the base station. FIG. 1 illustrates an example of a general TSB, which manages the test call of a CDMA cellular system in accordance with the prior art. As illustrated in FIG. 1, it is necessary for the TSB to tune the synchronization with a mobile station to compare and analyze random data of the test call.

An option of mobile station loop-back service makes it possible to obtain all sorts of the quality information, based on an initial traffic information passed through the mobile station. With the option, the TSB sends the mobile station a series of information already known by the TSB. The mobile station receives the information and measures the forward link quality by confirming whether the information has been normally received, and loops-back the received information to the TSB. The measurement result is transmitted as reverse information and then re-sends the received information on the traffic. The TSB is able to measure the transmit/receive quality of the mobile station, based on the received information. Also, the test call makes it possible to establish a call to measure the performance of the overall system or makes it convenient to generate traffic data.

In order for the TSB to make a quality measurement, it is necessary for the TSB to already know information from the loop-back by the mobile station, so it is necessary to tune the synchronization between the mobile station and transceiver. A conventional means of tuning synchronization is performed by comparing packets by maintaining the index of forward and reverse frames derived from the establishment of a test call to the call's termination.

FIG. 2 shows a block diagram illustrating the conventional method for processing the transmit/receive index for test call synchronization. As illustrated in FIG. 2, the base station 204 increases a transmit-index, tx-index, whenever it transmits the frame 210 to the mobile station 203, in establishing test call 200. Base station 204 also increases a receive-index, rx-index, from the time when good frames are received sequentially as at 220. The conventional method for synchronization causes the reverse frame index to disperse, and as a result, the synchronization becomes de-tuned in the following cases:

1. First case—other frames are received by the TSB owing to differences of delay times because one mobile station receives radio waves from a plurality of base stations increasing the probability of occurrence of continuous handoffs in a congested radio wave environment typically associated with the center of a city;
2. Second case—when the reverse link is degraded and the quality of a series of sequential frames is damaged, the mobile station temporarily stops transmitting reverse frames and sequentially receives good forward frames for a specific time and then resumes transmitting the reverse frames; and
3. Third case—the reverse link is damaged owing to a specific cause regardless of the forward link quality and preventing the base station from receiving the reverse frames.

The above cases suffer from a decreased reliability of the measured result because there is no way to normalize the synchronization with the mobile station, and consequently, the quality of the link becomes disconnected with the measured result, even though the quality of reverse link returns is acceptable.

A similar method is addressed in U.S. Pat. No. 5,649,000, which discloses a method and apparatus for synchronizing timing among radio ports in wireless communications systems. In the method, time synchronization is achieved from the average time differences by receiving time from the frequencies with the highest quality. However, the method doesn't measure an exact time but an approximate time.

SUMMARY OF THE INVENTION

The present invention, as embodied and broadly described herein, provides a method for test call synchronization of a code division multiple access (CDMA) cellular system. The method comprises the steps of: (a) establishing a test call for a mobile station and base station; (b) maintaining a transmit index and sending the transmit index on each forward frame sent to the mobile station, the transmit index being masked from forward frames forming part of an initial traffic sent to the mobile station, the value of the transmit index being increased for every forward frame transmitted; (c) measuring forward link quality by the mobile station for each forward frame received by the mobile station and sending a reverse frame from the mobile station to the base station including information on said measured forward link quality and information contained in the forward frame (d) receiving and checking said reverse frame by the base station, and if the result of checking is normal, setting the value of a receive index to be equal to that of said transmit index included in the reverse frame, otherwise increasing the value of said receive index; and (e) substituting the transmit-index for the receive-index when the mobile station receives each frame from the base station, and as a result, the reverse link is good and the transmit-index is exact, wherein the transmit index being on the reverse frame.

According to the method of the present invention, the steps are repeatedly performed at the receipt of each frame. The method maintains the synchronization without hardware reference time in a test call of CDMA cellular system. The TSB maintains the synchronization for a test call and the test call synchronization for the network management of CDMA cellular system is performed independently of absolute time.

The present invention is advantageous in that it achieves a reliable measurement by maintaining synchronization with a mobile station regardless of link quality, as it is possible to solve the problem of the conventional method in that the synchronization is inconsistent with each other due to the degradation of link which causes the reverse frame index to disperse.

BRIEF DESCRIPTION OF THE DRAWINGS

Other objects and advantages of the invention will become apparent upon reading the detailed description and upon reference to the drawings, in which.

DESCRIPTION OF THE PREFERRED EMBODIMENTS

Figure 1:
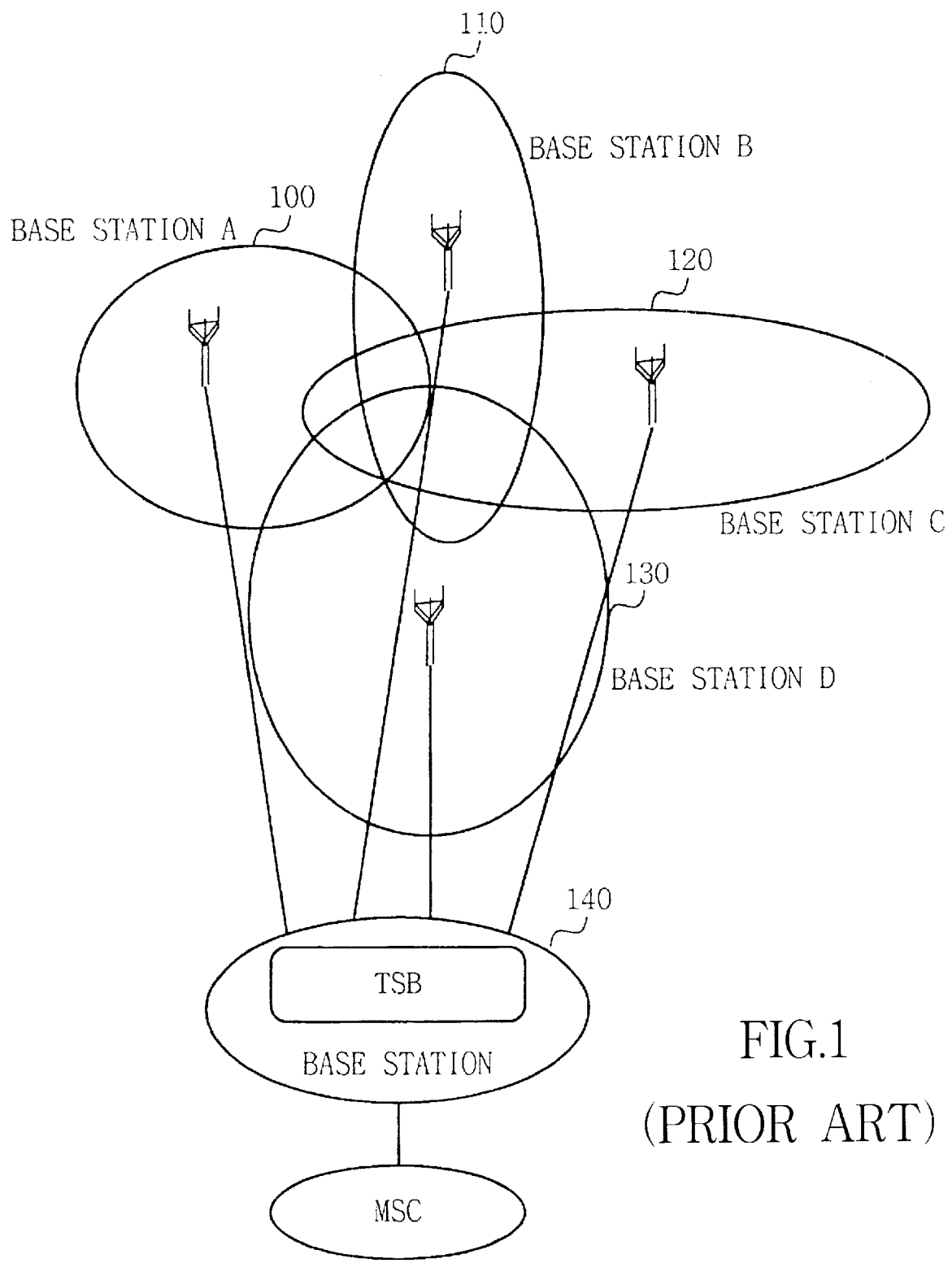
FIG. 1 illustrates an example of general TSB (Transceiver and Selector Bank) that manages a test call of a CDMA cellular system.
Figure 2:
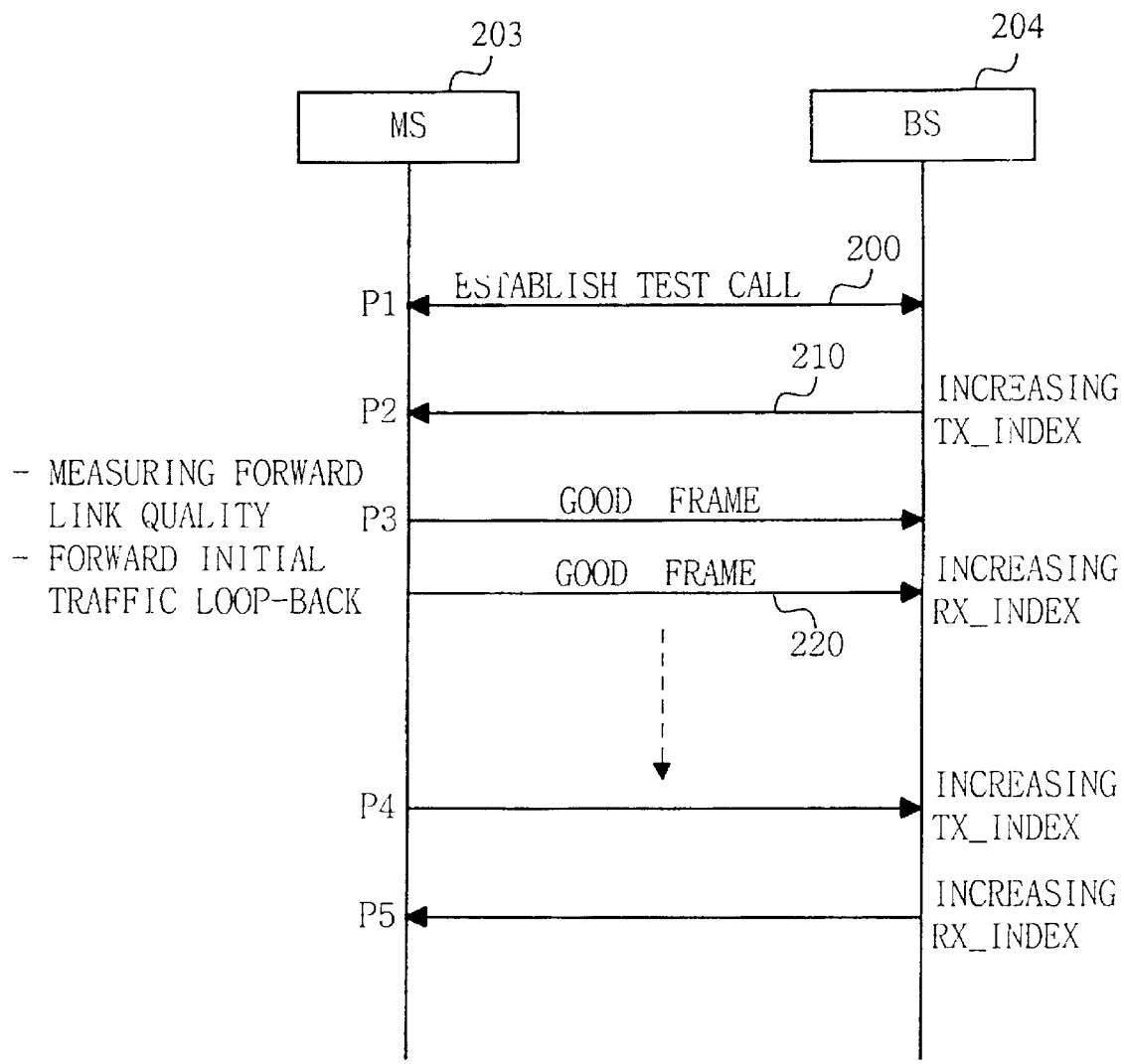
FIG. 2 illustrates a conventional method for processing transmit/receive index for test call synchronization.

A general overview of the method of the present invention will be described prior to discussing the figures in detail. If a test call is established between an MS and a BS, the BS sends the MS a first forward frame where the value of the Tx-index is set to one (1). The step of setting the Tx-index value in the forward frame is called masking. After transmitting the first forward frame, the BS continuously transmits a second frame, third frame, etc., every 20 ms until the test call is released. Upon receiving the first forward frame, the MS diagnoses the status of the forward link using information contained in the first forward frame. Diagnosing the forward frame will result in a determination by the MS that the status of the forward link is either normal or abnormal. A normal determination is equivalent to stating that the status of the forward link is good. An abnormal determination is equivalent to stating that the forward link status is not good. Subsequent to making the diagnosis, the MS transmits a first loop-back frame (i.e. a first reverse frame) to the BS through a reverse link corresponding to the first forward frame. The first loop-back frame includes the results of the diagnosis performed by the MS regarding the status of the forward link (i.e., normal/abnormal) and the first forward frame received from the BS. The BS receives the first loop-back frame and diagnoses the status of the reverse link using the loop-back frame. As a result of the diagnosis by the BS, a determination is made as to whether the reverse link is normal or abnormal. If the reverse link is diagnosed as abnormal, the reverse frame and the value of the Tx-index are considered damaged (i.e., not reliable). In this case, the BS increments the value of the Rx-index by one (1) and discards the damaged first reverse frame. It should be noted that the Rx-index is a value used by the BS to search for the original frame corresponding to the loop back frame from among the plurality of forward frames (i.e. $1^{st}$, $2^{nd}$, $3^{rd}$, etc. transmitted by the BS). That is, the BS searches for a frame having a value of Tx-index that is equal to the loop-back frame's Rx-index from among the plurality of transmitted forward frames. It is important to note that in the situation where the Rx-index is incremented by one, the reverse link is determined to be abnormal and the Tx-index is not searched for because the reverse frame is discarded. Only in the situation where the reverse link is normal will the Tx-index be searched.

If as a result of the diagnosis it is determined that the reverse link status is normal (i.e. 1 in the present example), the BS then sets the Rx-index to be equal to the transmitted value of the Tx-index (i.e. 1 in the present example) The BS then searches for the first frame having a value of Tx-index that is equal to the set Rx-index, and compares the loop-back frame with the first frame as a result of the search.

The aforementioned steps make it possible for the BS to know the normal value of RX-index at all times, even though the BS has not received several loop-back frames as a result of the reverse link being bad.

Figure 3:
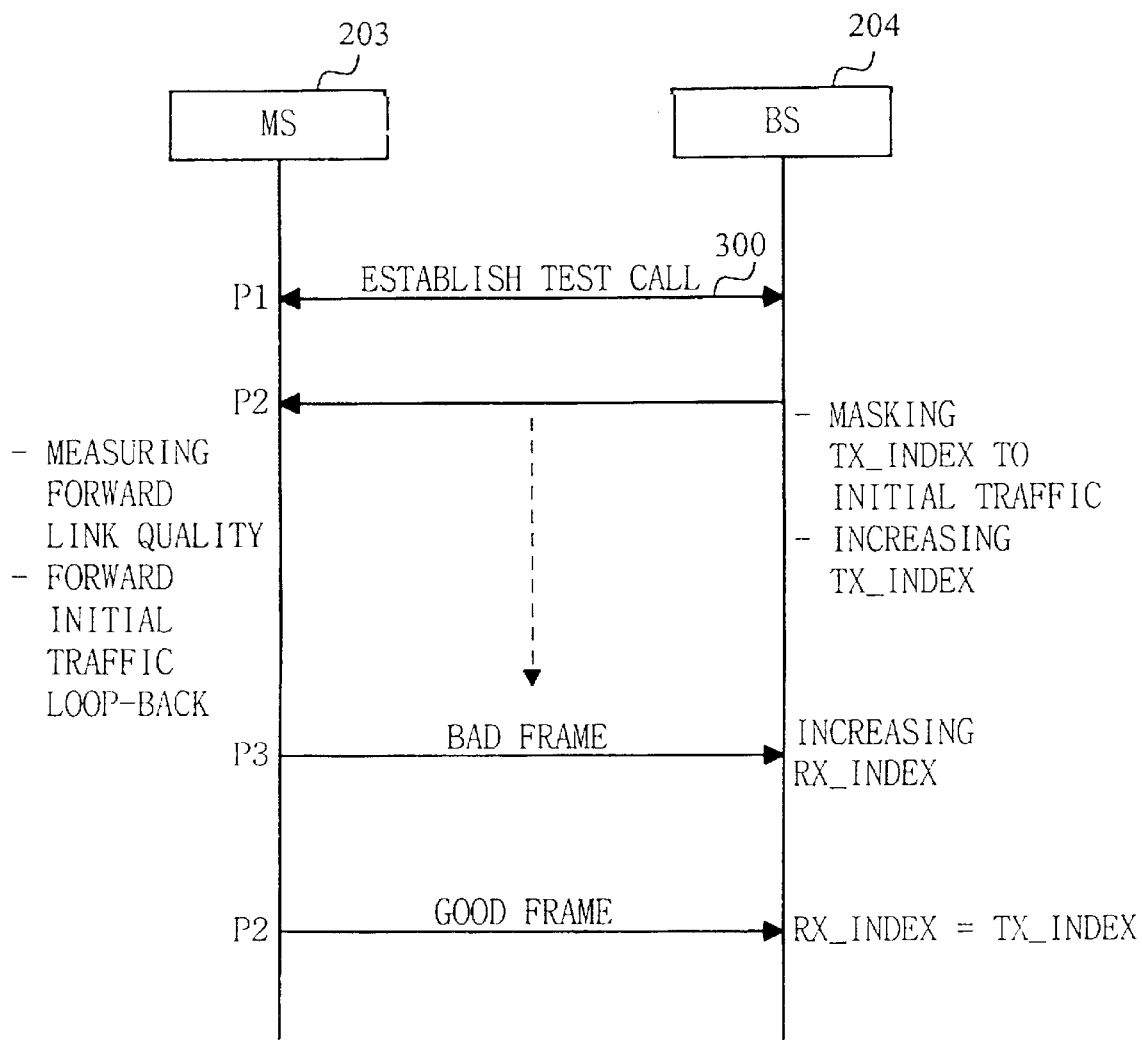
FIG. 3 illustrates a method for processing transmit/receive index for the test call synchronization according to the present invention.

The test call synchronization method of the present invention maintains synchronization between a base station and a mobile station during a call establishment. FIG. 3 is a block diagram illustrating a preferred embodiment of the method of the present invention for processing a transmit/receive index for test call synchronization according to the present invention, while FIG. 4 shows a flow chart illustrating a method for test call synchronization of CDMA cellular system according to the present invention as stated above.

Figure 4:
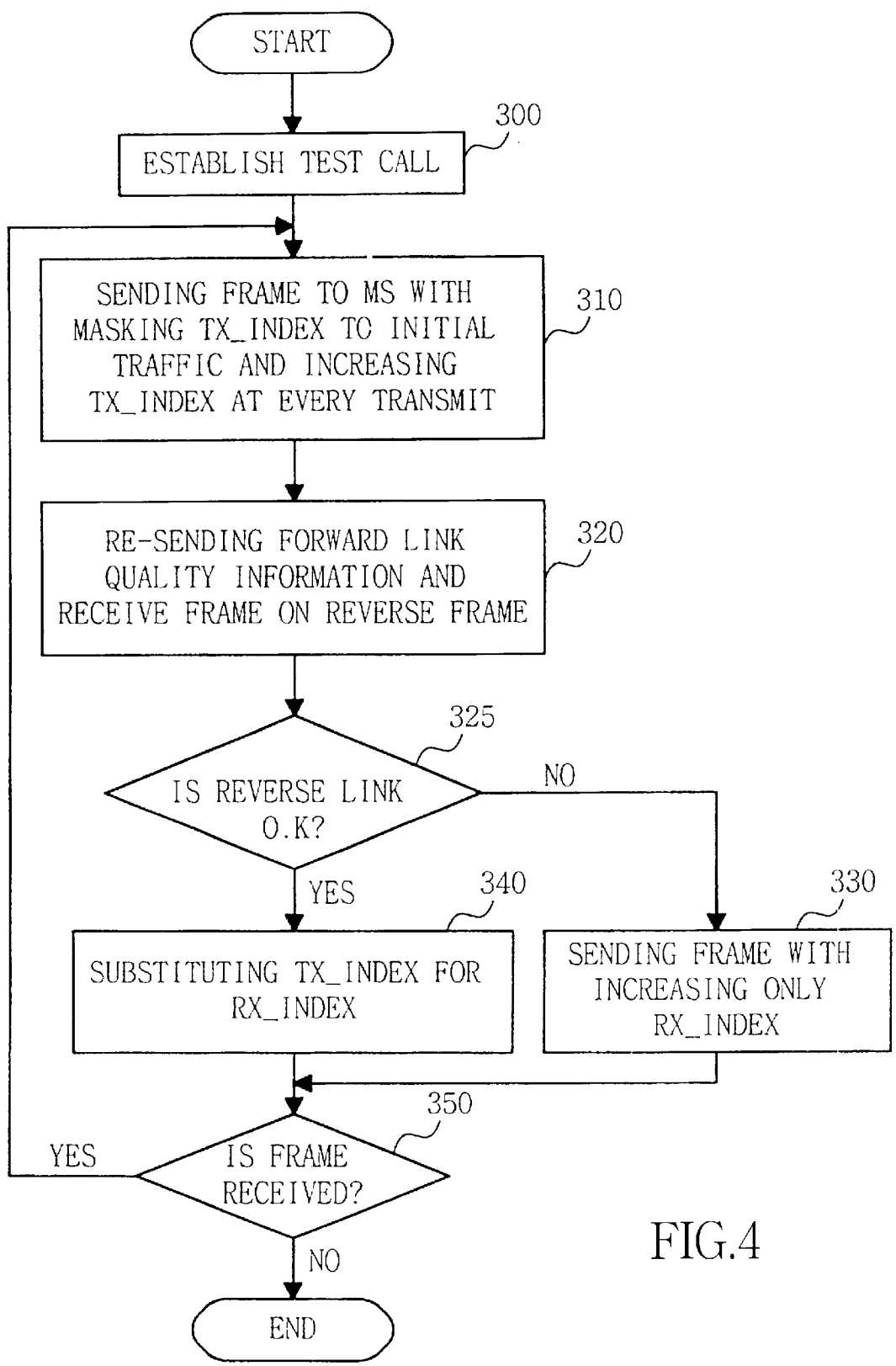
FIG. 4 is a flow chart illustrating a method for test call synchronization of code division multiple access (CDMA) cellular system according to the present invention.

Referring to FIGS. 3 and 4, the TSB of base station BS 204 sends the transmit-index on a frame at every transmit interval to maintain synchronization while the establishment of test call is maintained at step 300, and base station 204 performs masking (i.e. setting ) of the transmit-index to a frame and increases the transmit-index at every frame, and then sends the frame to the mobile station 203 at step 310, wherein the transmit-index is managed by the TSB.

The mobile station 203 re-sends the information of the forward link quality and the receive frame on a reverse frame at step 320 wherein a test call is established for the mobile station and the mobile station receives each frame from the base station 204.

The mobile station 203, as a result of examining the reverse link status at step 325 and determining that the reverse link is not satisfactory, sends the frame to the base station only to increase the receive-index at step 330 when the reverse link is determined to be degraded and the transmit-index is damaged. When the reverse link is good and the transmit-index is exact (i.e., not damaged), the mobile station tunes the test call synchronization by substituting the transmit-index for the receive-index at step 340, wherein the transmit-index is a component of the receive frame.

By repeatedly performing the above steps after receiving each frame at step 350 it is possible to solve the problems associated with conventional methods for maintaining synchronization in that the synchronization becomes inconsistent with each other due to the link degradation causing the reverse frame index to disperse.

The present invention is advantageous in that it achieves a reliable measurement by maintaining synchronization with a mobile station regardless of link quality.

While the invention is susceptible to various modification and alternative forms, specific embodiments thereof have been shown by way of example in the drawings and will be herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. A method for synchronizing a test call of a code division multiple access (CDMA) cellular system comprising the steps of:

(i.) establishing a test call between a mobile station and a base station;

(ii.) maintaining a transmit index in said base station and sending the transmit index on each forward frame sent to the mobile station, the transmit index being masked to forward frames which comprise initial traffic sent to the mobile station, the value of the transmit index being increased for every forward frame transmitted;

(iii.) measuring forward link quality by the mobile station for each forward frame received by the mobile station and sending a reverse frame from the mobile station to the base station including information on said measured forward link quality and said information contained in the forward frame;

(iv.) receiving and checking said received reverse frame by the base station, if said checking yields a normal result, setting the value of a receive index to be equal to that of said transmit index included in the reverse frame, otherwise increasing the value of said receive index; and (v.) substituting the transmit-index for the receive-index when the mobile station receives each frame from the base station.

2. The method as set forth in claim 1, wherein said steps (ii–v) are repeatedly performed at each transmitted forward frame.

3. The method as set forth in claim 1, wherein steps (i–v) maintain synchronization between said base station and said mobile station without a hardware reference time during a test call of said CDMA cellular system.

4. The method as set forth in claim 3, wherein a transceiver and selector bank maintains said synchronization for the duration of the test call.

5. The method as set forth in claim 1, wherein the test call synchronization is performed independent of an absolute time.

* * * * *